US009048896B2

(12) United States Patent
Shin

(10) Patent No.: US 9,048,896 B2
(45) Date of Patent: Jun. 2, 2015

(54) APPARATUS FOR MULTI-USER MULTI-ANTENNA TRANSMISSION BASED ON DOUBLE CODEBOOK AND METHOD FOR THE SAME

(71) Applicant: Electronics and Telecommunications Research Institute, Daejeon (KR)

(72) Inventor: Choon Woo Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/088,986

(22) Filed: Nov. 25, 2013

(65) Prior Publication Data

US 2014/0294107 A1    Oct. 2, 2014

(30) Foreign Application Priority Data

Mar. 28, 2013   (KR) .................. 10-2013-0033395

(51) Int. Cl.
*H04B 7/06*   (2006.01)
*H04B 7/04*   (2006.01)

(52) U.S. Cl.
CPC ............ *H04B 7/0456* (2013.01); *H04B 7/0452* (2013.01); *H04B 7/0617* (2013.01)

(58) Field of Classification Search
CPC .......... H04B 7/02; H04B 7/022; H04B 7/024; H04B 7/026; H04B 7/04; H04B 7/0408; H04B 7/0413; H04B 7/0417; H04B 7/0421; H04B 7/043; H04B 7/0434; H04B 7/0439; H04B 7/0452; H04B 7/0456; H04B 7/0465; H04B 7/0482
USPC .......... 375/259, 260, 267, 285, 295, 296, 299
See application file for complete search history.

(56) References Cited

U.S. PATENT DOCUMENTS 8,743,724 B2 *   6/2014   Kwon et al. .................. 370/252
2008/0144733 A1 *   6/2008   ElGamal et al. .............. 375/267

(Continued)

FOREIGN PATENT DOCUMENTS

KR   10-2009-0023879   3/2009
KR       10-1005876   1/2011

(Continued)

OTHER PUBLICATIONS

Peel, Christian B. et al., "A Vector-Perturbation Technique for Near-Capacity Multiantenna Multiuser Communication—Part I: Channel Inversion and Regularization," IEEE Transactions on Communications, vol. 53 (1):195-302 (2005).

*Primary Examiner* — Siu Lee
(74) *Attorney, Agent, or Firm* — Nelson Mullins Riley & Scarborough LLP

(57) ABSTRACT

Double codebook-based multi-user, a multi-antenna transmission apparatus and a transmission method are started. A transmission apparatus includes an effective channel information reception unit configured to receive an effective channel matrix for a transmission channel, a zero-forcing precoding unit configured to receive data streams and perform zero-forcing precoding to null inter-user interference based on the effective channel matrix, a beam forming unit configured to receive the data streams subjected to the zero-forcing precoding from the zero-forcing precoding unit and perform beam forming, and a multi-antenna array configured to transmit the data streams subjected to the beam forming by the beam forming unit to the multi-user. With the method and apparatus, it is possible to improve a transmission capacity and effectively process an interference between terminals in a multi-layer beam forming environment.

14 Claims, 3 Drawing Sheets

(56) References Cited

U.S. PATENT DOCUMENTS

| | | | |
|---|---|---|---|
| 2009/0066577 A1* | 3/2009 | Kim et al. | 342/373 |
| 2011/0142149 A1 | 6/2011 | Shin et al. | |
| 2011/0158345 A1* | 6/2011 | Ihm et al. | 375/295 |
| 2011/0177834 A1* | 7/2011 | Shin et al. | 455/501 |
| 2012/0281659 A1* | 11/2012 | Zhang et al. | 370/329 |
| 2013/0034178 A1* | 2/2013 | Hu et al. | 375/267 |
| 2013/0058205 A1* | 3/2013 | Tang | 370/203 |
| 2013/0329772 A1* | 12/2013 | Wernersson et al. | 375/219 |

FOREIGN PATENT DOCUMENTS

| | | |
|---|---|---|
| KR | 10-2011-0068802 | 6/2011 |
| KR | 10-2011-0119520 | 11/2011 |
| WO | 2011/136473 A2 | 11/2011 |

\* cited by examiner

APPARATUS FOR MULTI-USER MULTI-ANTENNA TRANSMISSION BASED ON DOUBLE CODEBOOK AND METHOD FOR THE SAME

CLAIM FOR PRIORITY

This application claims priority to Korean Patent Application No. 10-2013-0033395 filed on Mar. 28, 2013 in the Korean Intellectual Property Office (KIPO), the entire contents of which are hereby incorporated by reference.

BACKGROUND

1. Technical Field

Example embodiments of the present invention relate to cellular mobile telecommunication, and more specifically, to a multi-user multi-antenna transmission apparatus using a double codebook in a multi-user multi-antenna system and a multi-user multi-antenna transmission method.

2. Related Art

A communication standard for applying a transmission and reception multi-antenna in order to improve a transmission capacity of a wireless cellular mobile telecommunication system has been actively discussed by 3GPP LTE (Long Term Evolution) and IEEE 802.16 standardization groups.

Recently, a transmission method for increasing the number of transmission antennas in units of tens of antennas for increase of a downlink transmission capacity has been studied. An implementation of LTE technology in the form of a double codebook in consideration of a limited feedback capacity when the LTE technology is applied to a FDD (frequency division duplex) system is currently considered.

In this case, a first-order codebook applies an effective channel to a wideband in DFT (Discrete Fourier Transform)-based fixed beam and determines a second-order codebook-based precoding matrix that maximizes a transmission capacity in units of sub-bands.

However, in the case of multi-user multi-antenna transmission based on the double codebook, it is necessary to improve a transmission capacity and process interference between the terminals.

SUMMARY

Accordingly, example embodiments of the present invention are provided to substantially obviate one or more problems due to limitations and disadvantages of the related art.

Example embodiments of the present invention provide an apparatus for multi-user multi-antenna transmission based on a double codebook that is capable of improving a transmission capacity and effectively processing interference between terminals. Example embodiments of the present invention also provide a method for multi-user multi-antenna transmission based on a double codebook that is capable of improving a transmission capacity and effectively processing interference between terminals.

In some example embodiments, an apparatus of multi-antenna transmission to a multi-user includes an effective channel information reception unit configured to receive an effective channel matrix for a transmission channel from a reception apparatus; a zero-forcing precoding unit configured to receive data streams and perform zero-forcing precoding to null inter-user interference based on the effective channel matrix; a beam forming unit configured to receive the data streams subjected to the zero-forcing precoding from the zero-forcing precoding unit and perform beam forming; and a multi-antenna array configured to transmit the streams subjected to the beam forming by the beam forming unit to the multi-user.

Here, the apparatus may further include a demodulation pilot signal generation unit configured to provide a demodulation pilot signal to the zero-forcing precoding unit. In this case, the demodulation pilot signal may be a demodulation reference signal (DM-RS) for a 3GPP LTE-Advanced system. In this case, the zero-forcing precoding unit may be configured to precode the demodulation pilot signal input from the demodulation pilot signal generation unit like the data streams.

Here, the apparatus may further include a channel measurement pilot signal generation unit configured to provide a channel measurement pilot signal to the beam forming unit. In this case, the channel measurement pilot signal may be a cell-specific reference signal (CRS) for a 3GPP LTE or LTE-Advanced system. In this case, the channel measurement pilot signal may be a channel state information reference signal (CSI-RS) for a 3GPP LTE-Advanced system.

Here, the apparatus may further include a beam selection unit configured to provide a beam index to the beam forming unit. In this case, the beam selection unit may be configured to select the beam index so that an effective channel is approximately orthogonal, based on a zero-forcing precoding matrix used in the zero-forcing precoding unit.

In other example embodiments, a method for multi-antenna transmission to a multi-user includes an effective channel information reception step of receiving an effective channel matrix for a transmission channel from a reception apparatus; a zero-forcing precoding step of receiving data streams and performing zero-forcing precoding to null inter-user interference based on the effective channel matrix; a beam forming step of receiving the data streams subjected to the zero-forcing precoding and performing beam forming; and a step of transmitting the data streams subjected to the beam forming in the beam forming step to the multi-user.

Here, the zero-forcing precoding step may include precoding a demodulation pilot signal like the data streams. In this case, the demodulation pilot signal may be a demodulation reference signal (DM-RS) for a 3GPP LTE-Advanced system.

Here, the beam forming step may include receiving a channel measurement pilot signal and performing beam forming on the channel measurement pilot signal together with the data streams subjected to the zero-forcing. In this case, the channel measurement pilot signal may be a cell-specific reference signal (CRS) for a 3GPP LTE or LTE-Advanced system. In this case, the channel measurement pilot signal is a channel state information reference signal (CSI-RS) for a 3GPP LTE-Advanced system.

Here, the beam forming step may include performing the beam forming so that an effective channel is approximately orthogonal, based on a zero-forcing precoding matrix used in the zero-forcing precoding step.

With the multi-user multi-antenna transmission method and apparatus as described above, it is possible to improve a transmission capacity and effectively process interference between terminals in a multi-layer beam forming environment.

Particularly, it is possible to simultaneously support more user terminals without additionally assigning resources such as an orthogonal cover and an orthogonal sequence to a demodulation reference signal since precoding capable of nulling inter-user interference is applied in the transmission apparatus, unlike an existing system.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Figure 1:
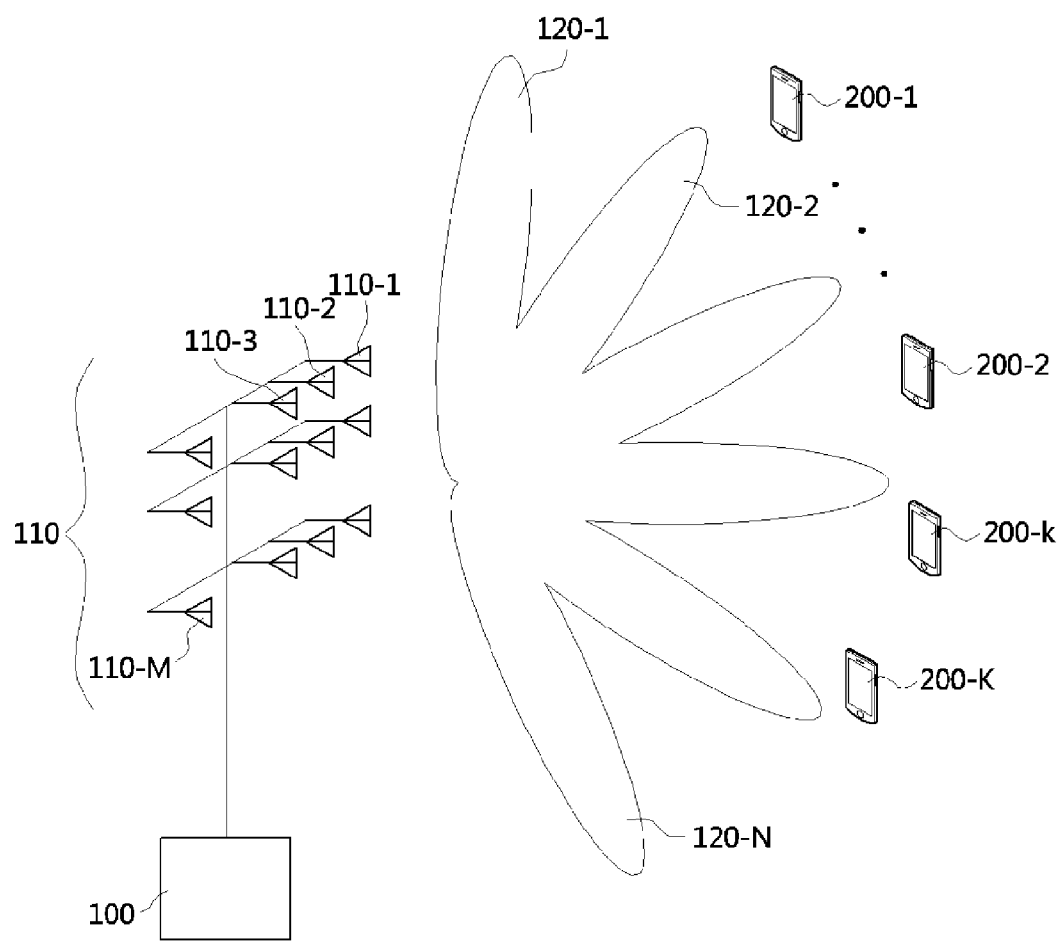
FIG. 1 is a conceptual diagram illustrating a cellular mobile telecommunication system environment to which a multi-user multi-antenna transmission method according to an example embodiment of the present invention is applied.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific example embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The terminology used herein is for the purpose of describing particular example embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

"Terminal" used in this application refers to a mobile station (MS), user equipment (UE), a user terminal (UT), a wireless terminal, an access terminal (AT), a terminal, a subscriber unit, a subscriber station (SS), a wireless device, a wireless communication device, a wireless transmit/receive unit (WTRU), a mobile node, mobile, or the like. Various example embodiments of a terminal may include a cellphone, a smartphone having a wireless communication function, a personal digital assistant (PDA) having a wireless communication function, a wireless modem, a portable computer having a wireless communication function, a photographing device such as a digital camera having a wireless communication function, a gaming device having a wireless communication function, a music storage and reproduction home appliance having a wireless communication function, an Internet home appliance capable of wireless Internet access and browsing, and a portable unit or a terminal having a combination of such functions, but is not limited thereto.

"Base station" used in this application generally refers to a fixed or mobile point that communicates with a terminal, and may be a term indicating a base station, Node-B, eNode-B, a BTS (base transceiver system), an access point, a relay, and a femto-cell.

Hereinafter, example embodiments of the present invention will be described in greater detail with reference to the accompanying drawings. To facilitate understanding of the present invention, like numbers refer to like elements throughout the description of the drawings, and description of the same element will not be reiterated.

Hereinafter, example embodiments of the present invention will be described with reference to a cellular mobile telecommunication system implemented in a frequency division duplexing (FDD) scheme, for convenience of a description. However, coverage of the present invention includes a cellular mobile telecommunication system implemented in a time division duplexing (TDD) scheme.

Embodiments of the present invention relate to a method for multi-user multi-antenna transmission based on a double codebook. A configuration example of the multi-user multi-antenna transmission apparatus capable of performing precoding and beam forming so that an effective channel is approximately orthogonal and performing transmission will be first described, and then an example embodiment of the multi-user multi-antenna transmission method will be described.

FIG. 1 is a conceptual diagram illustrating a cellular mobile telecommunication system environment to which the multi-user multi-antenna transmission method according to an example embodiment of the present invention is applied.

Refer to FIG. 1, a multi-antenna array 110 including a plurality of antennas 110-1, . . . , 110-M is arranged in a base station 100, and a plurality of beams 120-1, . . . , 120-N may be formed by the multi-antenna array 110.

A plurality of terminals 200-1, . . . , 200-K are served by the base station, and the base station performs multi-user multi-antenna transmission to the plurality of terminals through the plurality of beams.

In this case, a received signal of the k-th user terminal 200-$k$ may be represented as Equation 1:

$$y_k = \gamma h_k^T B P x + n_k = \gamma h_k^T W x + n_k \quad \text{[Equation 1]}$$

where $x = [x_1, \ldots, x_{N_S}]^T$ means a transmission symbol vector to be transmitted by the base station 100 (i.e.,. a vector having elements corresponding to the number ($N_S$) of data streams transmitted by the base station, and W=BP means a transmission-stage precoding matrix.

In this case, W=BP is a double codebook-based precoding matrix and includes $B=[b_1, \ldots, b_{N_B}] \in C^{M \times N_B}$, that is a discrete Fourier transform (DFT)-based beam forming matrix and a precoding matrix $P \in C^{N_B \times N_S}$ for handling inter-user interference.

Here, the total number of user terminals targeted for multi-user transmission is indicated by K, the total number of transmission antennas is indicated by M, the number of beams generated by the antenna array is indicated by $N_B$, and the number of data streams is indicated by $N_S$. In addition, y indicates a transmission power scaling factor.

In this case, K, M, $N_B$ and $N_S$ generally have a relationship as shown in Equation 2.

$$M \geq N_B \geq N_S = K \quad \text{[Equation 2]}$$

Meanwhile, when received signals of a total number K of terminals are concatenated and represented, may be represented as Equation 3.

$$y = \gamma HBPx + n = \gamma HWx + n \quad \text{[Equation 3]}$$

where $y=[y_1, \ldots, y_k]^T$ is a vector obtained by concatenating received signals of a total number K of terminals, $H=[h_1^T, \ldots, h_K^T]^T$ is a matrix obtained by concatenating channel matrixes for the total number K of terminals, and $n=[n_1, \ldots, n_K]^T$ is a vector obtained by concatenating noises for the total number K of terminals.

In an example embodiment of the present invention, B is a first-order codebook, P is a second-order codebook, and a transmission apparatus to which a W=BP transmission-stage precoder in which B and P have been concatenated is applied is a double codebook-based transmission apparatus.

Meanwhile, while a codebook generally refers to a set of precoders, the codebook cited herein refers to a selected transmission processor. In other words, it should be understood that the first-order codebook refers to a beam forming matrix (beamformer) B and the second-order codebook refers to a precoder P.

Figure 2:
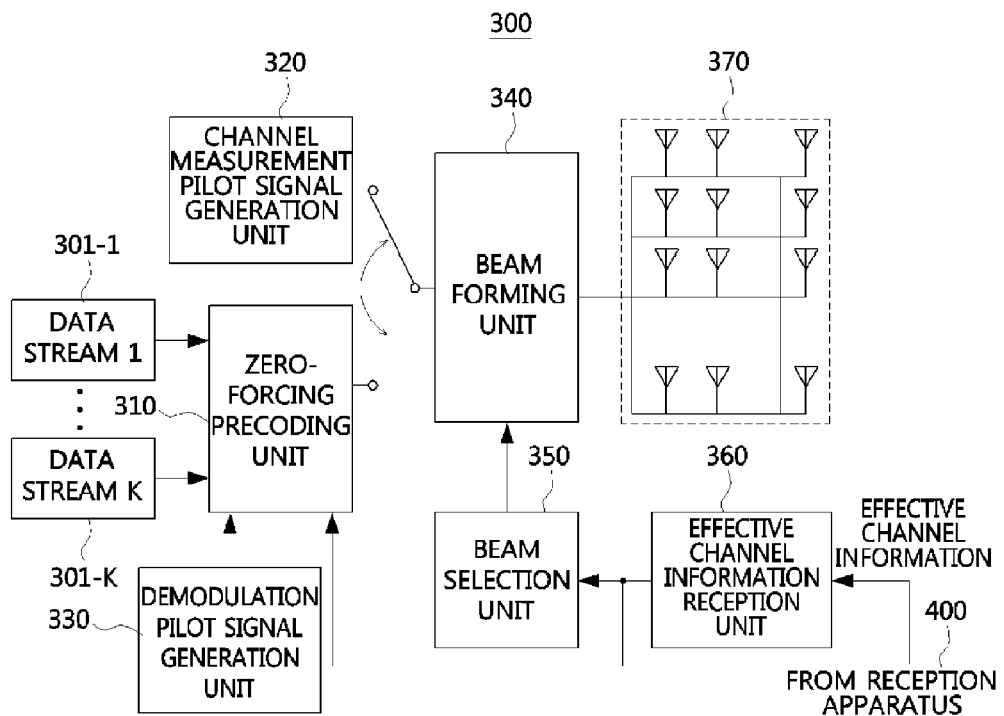
FIG. 2 is a block diagram illustrating a configuration example of a multi-user multi-antenna transmission apparatus according to an example embodiment of the present invention.

Configuration Example of Multi-User Multi-Antenna Transmission Apparatus According to an Example Embodiment of the Present Invention FIG. 2 is a block diagram illustrating a configuration example of a multi-user multi-antenna transmission apparatus according to an example embodiment of the present invention.

Referring to FIG. 2, a transmission apparatus 300 according to an example embodiment of the present invention may include a zero-forcing precoding unit 310, a channel measurement pilot signal generation unit 320, a demodulation pilot signal generation unit 330, a beam forming unit 340, a beam selection unit 350, an effective channel information reception unit 360, and a multi-antenna array 370.

The zero-forcing precoding unit 310 is a component that receives data streams 301-1, ..., 301-K for K users and performs zero-forcing precoding, and is a component that receives the effective channel HB by which the first-order codebook (i.e., the beam forming matrix; B) has been multiplied, which is fed back from the user terminals via the effective channel information reception unit 360, and uses the effective channel HB to obtain a second-order zero-forcing codebook for nulling the inter-user interference.

In other words, the zero-forcing precoding unit 310 may build a downlink transmission channel in a spatial division multiple access (SDMA) form to process the inter-user interference as described above.

Meanwhile, the transmission apparatus 300 receives, from the channel measurement pilot signal generation unit 320, a channel measurement pilot signal for channel state measurement to obtain information of the effective channel (HB), and transmits the channel measurement pilot signal to the reception apparatus via the beam forming unit 340. In other words, the channel measurement pilot signal is input to the beam forming unit 340 directly without via the zero-forcing precoding unit 310.

In this case, as the channel measurement pilot signal, CRS (cell specific RS) may be used in a 3GPP LTE system and CRS (cell specific RS) or CSI-RS (channel state information RS) may be used in a 3GPP LTE-A (LTE-Advanced) system.

Further, the zero-forcing precoding unit 310 receives, from the demodulation pilot signal generation unit 330, a demodulation pilot signal that enables the receiver to demodulate the data streams. The zero-forcing precoding unit 310 may be configured to apply precoding to the demodulation pilot signal input from the demodulation pilot signal generation unit 330 like the data stream, and output the demodulation pilot signal to the beam forming unit 340. In 3GPP LTE-Advanced, the demodulation pilot signal for this is defined as DM-RS (demodulation reference signal), and in a MU-MIMO environment, simultaneous transmission to a maximum of four user terminals using an orthogonal cover code (OCC) and a pseudo random sequence can be performed.

Meanwhile, the reception apparatus of each user terminal receives the channel measurement pilot signal that has been transmitted by the transmission apparatus, estimates the effective channel using the channel measurement pilot signal, and feeds the effective channel back to the transmission apparatus. In the transmission apparatus, the effective channel reception unit 360 receives the effective channel information fed back from the reception apparatus and provides the received effective channel information to the zero-forcing precoding unit 310 and the beam selection unit 350 that will be described below.

Figure 3:
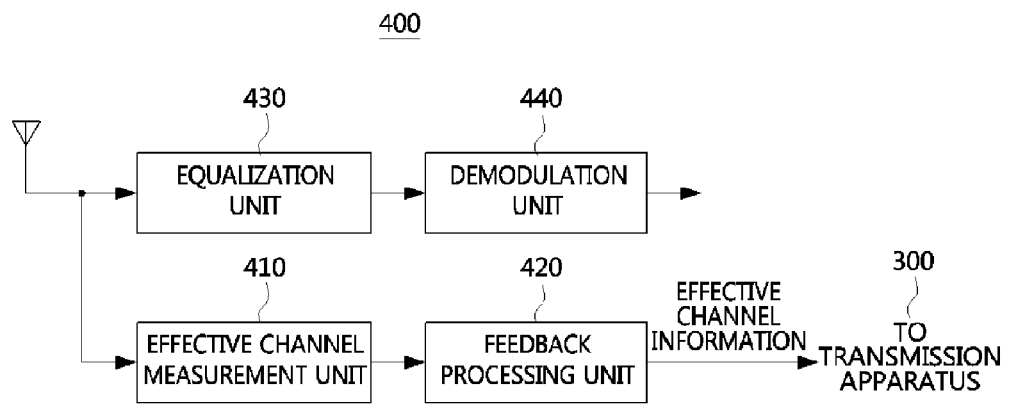
FIG. 3 is a block diagram illustrating a configuration example of a reception apparatus of a terminal corresponding to a multi-user multi-antenna transmission apparatus according to an example embodiment of the present invention.

FIG. 3 is a block diagram illustrating a configuration example of the reception apparatus of the terminal that corresponds to the multi-user multi-antenna transmission apparatus according to an example embodiment of the present invention.

A configuration of the reception apparatus 400 of the terminal illustrated in FIG. 3 is only one example embodiment. The reception apparatus of the terminal corresponding to the multi-user multi-antenna transmission apparatus according to an example embodiment of the present invention may have various configurations.

Referring to FIG. 3, the reception apparatus 400 of the terminal corresponding to the multi-user multi-antenna transmission apparatus according to an example embodiment of the present invention may include an effective channel measurement unit 410 that measures the effective channel using the channel measurement pilot signal received from the transmission apparatus according to an example embodiment of the present invention, and a feedback processing unit 420 that feeds the effective channel (matrix) measured by the effective channel measurement unit 410 back to the base station (the transmission apparatus according to an example embodiment of the present invention described above, more specifically, the effective channel information reception unit 360 of the transmission apparatus).

The reception apparatus 400 of the terminal includes an equalization unit 430 that performs equalization on a received signal, and a demodulation unit 440 that demodulates a data stream using the demodulation pilot signal included in the received signal. The reception apparatus 400 may perform the equalization and the demodulation on the received signal, but a description of the equalization and the demodulation may be omitted since it departs the scope of the present invention.

Meanwhile, the beam forming unit 340 may form beams the number of which is equal to the maximum number (M) of transmission antennas. As described above, the number of transmission data streams is equal to or smaller than the number of beams generated by $$N_B \geq N_S = K.$$

Additionally, the transmission apparatus according to an example embodiment of the present invention may include the beam selection unit 350 that selects a beam in order to improve system performance.

In this case, the beam selection unit 350 according to an example embodiment of the present invention performs beam selection to form $B_S = [b_1, \ldots, b_{N_S}] \in C^{M \times N_S}$ in B.

The beam selection unit 350 may be configured to select a beam index so that the effective channel $HB_S$ is an approximately orthogonal channel in consideration of zero-forcing precoding to be used as the second-order codebook, based on the effective channel fed back from the reception apparatus via the effective channel information reception unit 360 and provide the beam index to the beam forming unit 340.

In this case, the beam selection unit 350 may use various algorithms to determine the beam index. Algorithm 1 below may be implemented as one example of one of the algorithms available to the beam selection unit 350.

---
Algorithm 1
---
Initialization
$T_i$ = 1:K,
i = 1,
 $S_0$ = [ ],
while (i ≤ $N_B$)
 Step 1
 for $cntT_i$ = 1:length($T_i$),
  $kT_i$ = $T_i$(1:length($T_i$)),
  if i == 1,
   ĝ(:,$T_i$(cntTi)) = Hb(:$kT_i$(cntTi):),
  else
   for j = 1:i − 1, $g(:,kT_i(cntTi)) = Hb(kT_i(cntTi)) - Hb(kT_i(cntTi))\frac{\hat{g}(:,j)}{\|\hat{g}(:,j)\|^2}$ end
  end
 end
 Step 2
  for $ckT_i$ = 1:length($kT_i$),
   norm_$kT_i$($ckT_i$) = ||g(:,$kT_i$($ckT_i$))||,
  end
  [val, ind] = max (norm_$kT_i$),
  $S_0$ = [$S_0$ $kT_i$(ind)],
  ĝ(:,i) = g(:$kT_i$(ind):),
 Step 3
  $T_{tmp}$ = [ ],
  cnt = 0,
  for $ckT_i$ = 1:length($kT_i$),
   if ckTi ≠ $kT_i$(ind),
    cnt = cnt + 1,
    $T_{tmp}$(cnt,1) = $kT_i$(cnt),
   end
  end
  $T_i$ = $T_{tmp}$,
  end
  i = i + 1,
end $S_0$ obtained by the beam selection unit 350 that has implemented the algorithm such as Algorithm 1 described above includes $N_S(=K)$ beam indexes that have been selected consequently. A zero-forcing-based second-order codebook (precoding matrix) obtained using the effective channel ($H_S = HB_S$) obtained based on $B_S$, which is obtained from $S_0$, may be represented as Equation 4 below.

$$P_S = H_S^H(H_S H_S^H)^{-1} \quad \text{[Equation 4]}$$

As a result, when the beam selection unit 350 proposed in the present invention is applied, a transmission apparatus-precoding matrix (double precoding matrix) may be represented as $W_S = B_S P_S$.

Meanwhile, the power scaling factor may be represented as Equation 5 blow corresponding to $W_S$.

$$\gamma = \frac{P_T}{\text{trace}(W_S W_S^H)} \quad \text{[Equation 5]}$$

The reception apparatus of each user terminal also performs channel estimation for demodulation on the received signal of a form as shown in Equation 1.

As described above, in 3GPP LTE-Advanced, the demodulation pilot signal for this is defined as DM-RS (demodulation reference signal), and in an MU-MIMO environment, simultaneous transmission to a maximum of four user terminals using an orthogonal cover code (OCC) and a pseudo random sequence can be performed.

Accordingly, when a precoder $W_S$ capable of nulling the inter-user interference is applied in a transmission apparatus as in the transmission apparatus of an example embodiment of the present invention, it is possible to simultaneously support more user terminals without assigning additional resources to DM-RS in the form of existing 3-GPP LTE-Advanced.

This may be described using the following equation 6.

$$\begin{aligned} y_k &= \gamma h_k^T W_S x + n_k \\ &= \gamma h_k^T w_k x_k + \gamma h_k^T \sum_{i \neq k} w_i x_i + n_k \\ &= \gamma h_k^T w_k x_k + n_k \end{aligned} \quad \text{[Equation 6]}$$

where the inter-user interference $$\gamma h_k^T \sum_{i \neq k} w_i x_i$$

is removed by the zero-forcing precoding unit 310 that nulls the inter-user interference in the transmission apparatus according to an example embodiment of the present invention described above.

Further, it can be seen that, if $x_k$ in Equation 6 is assumed to be DM-RS for estimating the channel $\gamma h_k^T w_k$ for a k-th user terminal, it is possible to estimate the effective channel for demodulation for each user without the influence of the inter-user interference even with assignment of DM-RS common to K users (i.e., $x_k = p$, ∀k) rather than assignment of unique DM-RS resource to each user terminal, unlike DM-RS of 3GPP LTE-Advanced.

Figure 4:
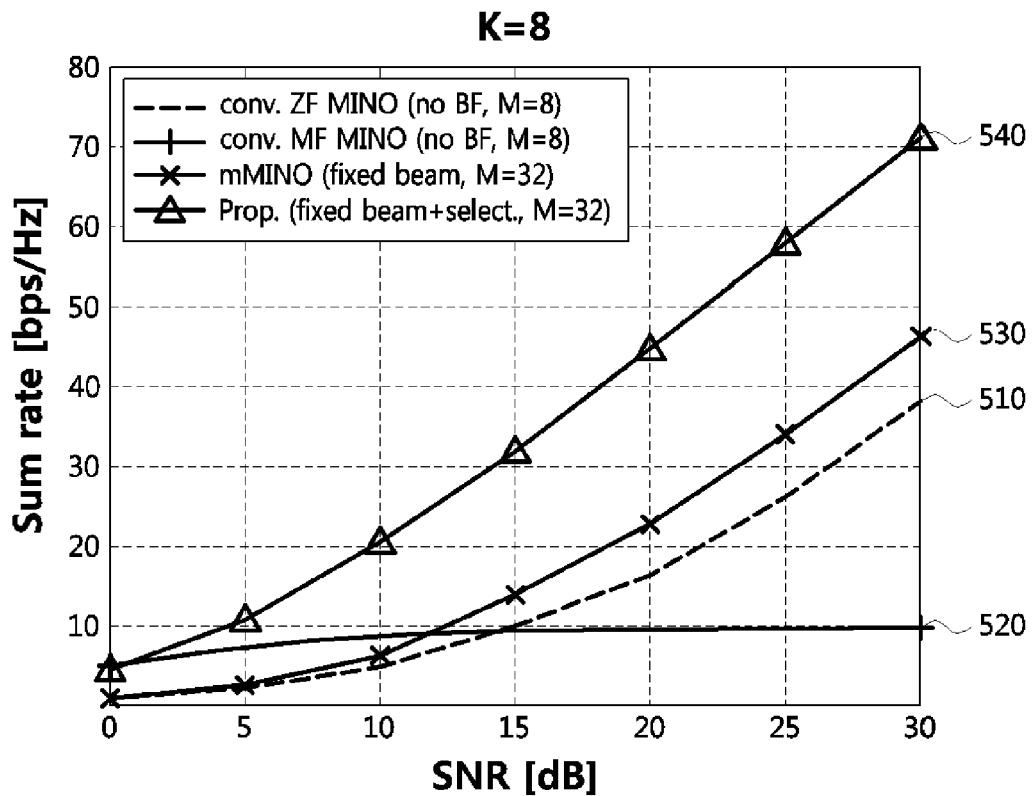
FIG. 4 is a graph illustrating increase of a total data capacity of a system when a multi-user multi-antenna transmission apparatus according to an example embodiment of a present invention has been applied.

FIG. 4 is a graph illustrating an increase of a total data capacity of the system when the multi-user multi-antenna transmission apparatus according to an example embodiment of the present invention is applied.

Referring to FIG. 4, a first experiment example 510 shows a sum rate (in bps/Hz) according to a signal to noise ratio (SNR; in dB) when only zero-forcing precoding according to a related art has been applied. A second experiment example 520 shows the sum rate according to the signal to noise ratio when only MF precoding according to a related art has been applied.

Further, a third experiment example 530 shows the sum rate according to the signal to noise ratio in the case of multi-user MIMO that provides a fixed beam, and a fourth experiment example 540 shows a change of the sum rate when the multi-user multi-antenna transmission method according to an example embodiment of the present invention has been applied.

In all the examples, the total number of users was assumed to be 8 (K=8). It was also assumed that an antenna array including 8 downlink antennas are used in the first experiment example and the second experiment example, and an antenna array including 32 downlink antennas are used in the third experiment example and the fourth experiment example.

Referring to FIG. 4, it can be seen that the fourth experiment example 540 to which the double codebook-based multi-user MIMO transmission method according to an example embodiment of the present invention has been applied shows a great increase in the sum rate as the signal to noise ratio increases, as compared with the other examples.

Figure 5:
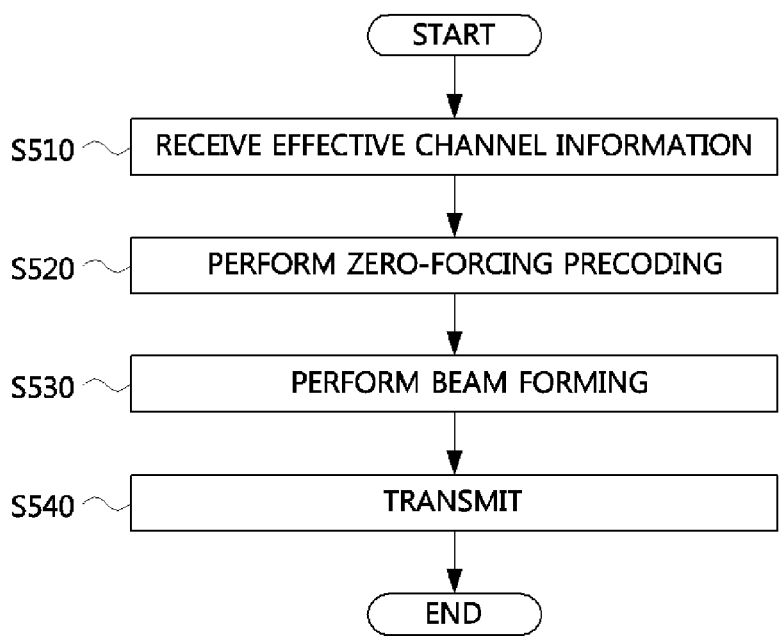
FIG. 5 is a flowchart illustrating a multi-user multi-antenna transmission method according to an example embodiment of the present invention.

Multi-User Multi-Antenna Transmission Method According to Example Embodiment of the Present Invention FIG. 5 is a flowchart illustrating a multi-user multi-antenna transmission method according to an example embodiment of the present invention.

Referring to FIG. 5, the multi-user multi-antenna transmission method according to an example embodiment of the present invention may include effective channel information reception step S510, zero-forcing precoding step S520, beam forming step S530 of performing beam forming, and step S540 of transmitting data streams subjected to the beam forming in the beam forming step to a multi-user.

Effective channel information reception step S510 is a step of receiving an effective channel matrix for a transmission channel from the reception apparatus.

In other words, effective channel information reception step S510 is a step of receiving an effective channel matrix that is measured by the effective channel measurement unit 410 of the reception apparatus of the terminal illustrated in FIG. 3 and fed back via the feedback processing unit 420. The effective channel matrix fed back from the terminal is an effective channel matrix measured using the channel measurement pilot signal, which has been transmitted by the transmission apparatus according to an example embodiment of the present invention.

The effective channel matrix received in effective channel information reception step S510 may be used in each of zero-forcing precoding step S520 and beam forming step S530, which will be described below.

Then, zero-forcing precoding step S520 is a step of receiving the data streams 301-1, . . . , 301-K for the K users and performing zero-forcing precoding and is a step of receiving data streams 301-1, . . . , 301-K for K users and performs zero-forcing precoding, and is a step of receiving the effective channel HB by which the first-order codebook (i.e., the beam forming matrix; B) has been multiplied, which is fed back from the user terminals in effective channel information reception step S510, and using the effective channel HB to obtain a second-order zero-forcing codebook for nulling the inter-user interference .

In other words, a downlink transmission channel in a spatial division multiple access (SDMA) form to process the inter-user interference may be built through zero-forcing precoding step S520. Since a process of determining the second-order codebook (i.e., zero-forcing precoding matrix) performed in step S520 has been described in Equation 4, a repeated description thereof will be omitted.

Meanwhile, the demodulation pilot signal may be precoded like the data streams in the zero-forcing precoding step S520. A demodulation reference signal (DM-RS) of a 3GPP LTE-Advanced system may be used as the demodulation pilot signal. Next, beam forming step S530 is a step of receiving the data streams precoded in zero-forcing precoding step S520 and performing beam forming on the data streams.

In beam forming step S530, a beam constituting $B_S = [b_1, \ldots, b_{N_S}] \in \mathbb{C}^{M \times N_S}$ in B is selected. In other words, in beam forming step S530, the beam may be selected so that the effective channel $HB_S$ is an approximately orthogonal channel, in consideration of zero-forcing precoding to be used as the second-order codebook, based on the effective channel matrix fed back from the reception apparatus through effective channel information reception step S510.

In this case, in beam forming step S530, various algorithms may be used to determine a beam index for selection of the beam. Algorithm 1 may be implemented as an example of one of the various algorithms.

Meanwhile, in the beam forming step, the channel measurement pilot signal may be received and subjected to beam forming together with the data stream subjected to the zero-forcing. A cell-specific reference signal (CRS) of a 3GPP LTE or LTE-Advanced system may be used as the channel measurement pilot signal. Alternatively, a channel state information reference signal (CSI-RS) of the 3GPP LTE-Advanced system may be used as the channel measurement pilot signal.

Finally, in step S540, the data streams to which the beam forming matrix has been applied in the beam forming step are transmitted to the multi-user using the multi-antenna array.

While the example embodiments of the present invention and their advantages have been described in detail, it should be understood that various changes, substitutions and alterations may be made herein without departing from the scope of the invention.

What is claimed is:

1. An apparatus for multi-antenna transmission to a multi-user, the apparatus comprising:
   an effective channel information receiver which receives an effective channel matrix for a transmission channel from a reception apparatus;
   a zero-forcing precoder which receives data streams and perform zero-forcing precoding to null inter-user interference based on the effective channel matrix;
   a beam former which receives the data streams subjected to the zero-forcing precoding from the zero-forcing precoder and performs beam forming; and
   multiple antennas in a multi-antenna array which transmit the streams subjected to the beam forming by the beam former to the multi-user; and
   a beam selector which provides a beam index to the beam former,
   wherein the beam selector selects the beam index so that an effective channel is approximately orthogonal, based on a zero-forcing precoding matrix used in the zero-forcing precoder.

2. The apparatus according to claim 1, further comprising:
   a demodulation pilot signal generator which provides a demodulation pilot signal to the zero-forcing precoder.

3. The apparatus according to claim 2, wherein: the demodulation pilot signal is a demodulation reference signal (DM-RS) for a 3GPP LTE-Advanced system.

4. The apparatus according to claim 2, wherein the zero-forcing precoder precodes the demodulation pilot signal input from the demodulation pilot signal generator, like the data streams.

5. The apparatus according to claim 1, further comprising:
a channel measurement pilot signal generator which provides a channel measurement pilot signal to the beam former.

6. The apparatus according to claim 5, wherein: the channel measurement pilot signal is a cell-specific reference signal (CRS) for a 3GPP LTE or LTE-Advanced system.

7. The apparatus according to claim 5, wherein: the channel measurement pilot signal is a channel state information reference signal (CSI-RS) for a 3GPP LTE-Advanced system.

8. A method of multi-antenna transmission to a multi-user, the method comprising:
an effective channel information reception step of receiving an effective channel matrix for a transmission channel from a reception apparatus;
a zero-forcing precoding step of receiving data streams, performing zero-forcing precoding to null inter-user interference based on the effective channel matrix, receiving the effective channel by which a first-order codebook has been multiplied and fed back, and using the effective channel to obtain a second-order zero forcing codebook for nulling the inter-user interference;
a beam forming step of receiving the data streams subjected to the zero-forcing precoding and performing beam forming; and
a step of transmitting the data streams subjected to the beam forming in the beam forming step to the multi-user.

9. The method according to claim 8, wherein: the zero-forcing precoding step includes precoding a demodulation pilot signal like the data streams.

10. The method according to claim 9, wherein: the demodulation pilot signal is a demodulation reference signal (DM-RS) for a 3GPP LTE-Advanced system.

11. The method according to claim 8, further comprising: the beam forming step includes receiving a channel measurement pilot signal and performing beam forming on the channel measurement pilot signal together with the data streams subjected to the zero-forcing.

12. The method according to claim 11, wherein: the channel measurement pilot signal is a cell-specific reference signal (CRS) for a 3GPP LTE or LTE-Advanced system.

13. The method according to claim 11, wherein: the channel measurement pilot signal is a channel state information reference signal (CSI-RS) for a 3GPP LTE-Advanced system.

14. The apparatus according to claim 8, wherein: the beam forming step includes performing the beam forming so that an effective channel is approximately orthogonal, based on a zero-forcing precoding matrix used in the zero-forcing precoding step.

* * * * *